(12) United States Patent
Shinohara et al.

(10) Patent No.: US 9,741,373 B1
(45) Date of Patent: Aug. 22, 2017

(54) MICROWAVE ASSISTED MAGNETIC HEAD, HEAD GIMBAL ASSEMBLY, AND MAGNETIC RECORDING DEVICE

(71) Applicant: TDK Corporation, Tokyo (JP)

(72) Inventors: Tetsuhito Shinohara, Tokyo (JP); Tetsuya Roppongi, Tokyo (JP); Yoshikazu Soeno, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/138,405

(22) Filed: Apr. 26, 2016

(51) Int. Cl.
| G11B 5/127 | (2006.01) |
| G11B 5/39 | (2006.01) |
| G11B 5/48 | (2006.01) |
| G11B 5/31 | (2006.01) |
| G11B 5/00 | (2006.01) |

(52) U.S. Cl.
CPC .......... *G11B 5/3912* (2013.01); *G11B 5/1278* (2013.01); *G11B 5/315* (2013.01); *G11B 5/3133* (2013.01); *G11B 5/4826* (2013.01); *G11B 2005/0024* (2013.01)

(58) Field of Classification Search
CPC ....... G11B 5/1278; G11B 5/23; G11B 5/3133; G11B 5/315
USPC .......................................... 360/125.3, 119.04
See application file for complete search history.

(56) References Cited

U.S. PATENT DOCUMENTS

| 8,320,079 B2 | 11/2012 | Iwasaki et al. | |
| 8,705,206 B1* | 4/2014 | Maeda | G11B 5/23 360/119.04 |
| 9,111,552 B1* | 8/2015 | Takeo | G11B 5/127 |
| 9,330,691 B1* | 5/2016 | Narita | G11B 5/1278 |
| 2010/0007996 A1 | 1/2010 | Iwasaki et al. | |
| 2012/0147502 A1* | 6/2012 | Udo | G11B 5/1278 360/125.12 |
| 2012/0281314 A1* | 11/2012 | Lopusnik | G11B 5/112 360/125.03 |
| 2013/0028058 A1* | 1/2013 | Yasui | G11B 5/1278 369/13.14 |
| 2013/0057981 A1* | 3/2013 | Urakami | G11B 5/1278 360/125.03 |
| 2014/0177100 A1* | 6/2014 | Sugiyama | G11B 5/3116 360/125.03 |

(Continued)

FOREIGN PATENT DOCUMENTS

JP    2010-003351 A    1/2010

*Primary Examiner* — Jefferson Evans
(74) *Attorney, Agent, or Firm* — Posz Law Group, PLC

(57) ABSTRACT

A microwave assisted magnetic head is equipped with a main magnetic pole that generates a recording magnetic field to be applied to a magnetic recording medium from an end surface forming a portion of an air bearing surface opposed to the magnetic recording medium, a trailing shield that is disposed interposing a write gap at a trailing side of the main magnetic pole, and that forms a magnetic path with the main magnetic pole, two side shields that are disposed at both sides of the main magnetic pole in the cross track direction, respectively, and a spin torque oscillator that is disposed within the write gap. The write gap is configured to substantially linearly extend along the cross track direction when viewed from an air bearing surface side, and is positioned between trailing-side end surfaces of the main magnetic pole and the two side shields, and a leading-side end surface of the trailing shield.

8 Claims, 11 Drawing Sheets

(56) References Cited

U.S. PATENT DOCUMENTS

| | | | | |
|---|---|---|---|---|
| 2014/0313616 A1* | 10/2014 | Kusukawa | ............. | G11B 5/187 |
| | | | | 360/125.03 |
| 2015/0043106 A1* | 2/2015 | Yamada | ............... | G11B 5/1278 |
| | | | | 360/123.05 |
| 2015/0332711 A1* | 11/2015 | Urakami | ................ | G11B 5/315 |
| | | | | 360/99.08 |
| 2016/0275985 A1* | 9/2016 | Sugawara | .......... | G11B 20/1217 |
| 2017/0047084 A1* | 2/2017 | Funayama | ............. | G11B 5/112 |
| 2017/0061995 A1* | 3/2017 | Taguchi | ................ | G11B 5/235 |

* cited by examiner

MICROWAVE ASSISTED MAGNETIC HEAD, HEAD GIMBAL ASSEMBLY, AND MAGNETIC RECORDING DEVICE

FIELD OF THE INVENTION

The present invention relates to a microwave assisted magnetic head, a head gimbal assembly and a magnetic recording device.

BACKGROUND OF THE INVENTION

In the field of magnetic recording using heads and media, there is a demand for further improvement in the performance of magnetic recording media and magnetic heads in association with the high recording density of a magnetic disk device.

The magnetic recording medium is a discontinuous medium where magnetic grains aggregate, and where each magnetic grain has a single magnetic domain structure. In the magnetic recording medium, one recording bit is composed of a plurality of magnetic grains. Consequently, in order to enhance the recording density, unevenness at a boundary of adjacent recording bits must be diminished by reducing the size of the magnetic grains. However, if the size of the magnetic grains is reduced, the thermal stability of magnetization of the magnetic grains is reduced, in association with the reduction of volume of the magnetic grains.

As a countermeasure against this problem, an increase of magnetic anisotropy energy Ku in the magnetic grains can be considered, but the increase of Ku causes an increase of an anisotropic magnetic field (coercive force) of the magnetic recording medium. In the meantime, the upper limit of the recording magnetic field intensity by the magnetic head is primarily determined according to saturation magnetic flux density of a soft magnetic material that configures a magnetic core within the head. Consequently, if the anisotropic magnetic field of the magnetic recording medium exceeds a tolerance value, which is determined from the upper limit of the recording magnetic field intensity, it becomes impossible to record into a magnetic recording medium.

At present, one method for solving the problem of thermal stability is energy assisted recording in which a magnetic recording medium formed with a magnetic material with high Ku is used. In this method, it is proposed to provide supplemental energy to the medium when recording to decrease the effective recording magnetic field intensity. The recording method using a microwave magnetic field as the supplemental energy source is referred to as microwave assisted magnetic recording (MAMR), and research and development are in progress for practical uses.

In the microwave assisted magnetic recording, the application of the microwave magnetic field in the medium in-plane direction of a frequency according to an effective magnetic field (Heff) relating to magnetization of a recording layer in the magnetic recording medium excites precession movement of the magnetization of the recording layer, and recording capability of a magnetic head is assisted.

As one example of a magnetic head using a microwave assisted magnetic recording method, as shown in FIG. 15, a magnetic head is proposed that is equipped with a main magnetic pole layer 6' that generates a recording magnetic field for application to a magnetic recording medium; a wraparound shield composed of a trailing shield 81' and side shields 82' and 83'; and a spin torque oscillator (STO) 10' that is disposed in the write gap between the main magnetic pole layer 6' and the trailing shield 81', and that has a multilayer structure with magnetic thin films (for example, U.S. Pat. No. 8,320,079). The STO 10' generates a microwave magnetic field in the in-plane direction by its self-oscillation. Precession movement of the magnetization of the recording layer is excited by applying the microwave magnetic field to the magnetic recording medium, and magnetization reversal in the perpendicular direction in the recording layer is assisted.

In such a magnetic head, in order to provide a sufficient assist effect by the STO 10', it is necessary to improve the oscillation frequency of the STO 10'. Consequently, it is desired to narrow the write gap as much as possible, and increase the magnetic intensity applied to the STO 10'. However, there is a limitation to narrowing the write gap where the STO 10' is formed, and it is difficult to increase the magnetic field intensity applied to the STO 10'.

Further, in the magnetic recording device using the magnetic head, to improve recording density it is necessary to improve both bit per inch (BPI) and track per inch (TPI). For the purpose of improvement of BPI and TPI, it is required to steepen the magnetic field gradient of the recording magnetic field in the down track direction and the cross track direction, respectively. If the track width where signals are recorded is narrowed in order to accomplish high recording density, record(s) in adjacent track(s) may be erased, which should be prevented by steepening the recording magnetic field gradient in the cross track direction.

SUMMARY OF THE INVENTION

The objective of the present invention is to provide a novel microwave assisted magnetic head, head gimbal assembly and magnetic recording device.

In order to accomplish the objective, the present invention provides a microwave assisted magnetic head that is equipped with a main magnetic pole that generates a recording magnetic field to be applied to a magnetic recording medium from an end surface constituting a portion of an air bearing surface opposed to the magnetic recording medium, a trailing shield that is disposed by interposing a write gap on the trailing side of the main magnetic pole, forming a magnetic path with the main magnetic pole, two side shields that are disposed at both sides of the main magnetic pole in the cross track direction, and a spin torque oscillator that is disposed within the write gap so as to be interposed between the main magnetic pole and the trailing shield, and that generates a microwave magnetic field to be superimposed on the magnetic recording field applied to the magnetic recording medium, wherein the write gap has a shape that substantially linearly extends along the cross track direction when viewed from the air bearing surface side, and is positioned between trailing-side end surfaces of the two side shields and a trailing-side end surface of the main magnetic pole, and, a leading-side end surface of the trailing shield.

In the above invention, it is preferable that the write gap has a first write gap part that is positioned nearly in a center in the cross track direction, where the spin torque oscillator is disposed, and a second write gap part and a third write gap part that are continued to both ends of the first write gap part in the cross track direction, and that extend toward both outer ends in the cross track direction, respectively; and lengths at least in portions of the second write gap part and the third write gap part in the down track direction are shorter than a length of the first write gap in the down track direction.

In the above invention, it is preferable that the write gap has a first write gap part that is positioned nearly in a center in the cross track direction, where the spin torque oscillator is disposed, and a second write gap part and a third write gap part that are continued to both ends of the first write gap part in the cross track direction, and that extend toward both outer ends in the cross track direction, respectively; and lengths of the second write gap part and the third write gap part in the down track direction are shorter than the length of the first write gap in the down track direction, respectively.

In the above invention, it is preferable that the write gap has a first write gap part that is positioned nearly in a center in the cross track direction, where the spin torque oscillator is disposed, and a second write gap part and a third write gap part that are continued to both ends of the first write gap part in the cross track direction, and that extend toward both outer ends in the cross track direction, respectively; the second write gap part and the third write gap part have a narrower gap part that is shorter than the length of the first write gap part in the down track direction; and when a segment that passes through the center of the main magnetic pole in the down track direction on the air bearing surface and is parallel in the down track direction is drawn, the length from the segment to the narrower gap parts in the second write gap part and the third write gap part are 120 nm or less in the cross track direction, respectively.

In the above invention, it is preferable that the length of the write gap in the cross track direction be 300 nm or greater.

Further, the present invention provides a head gimbal assembly that is equipped with the microwave assisted magnetic head relating to the above invention, and a suspension that supports the microwave assisted magnetic head (Invention 6).

In addition, the present invention provides a magnetic recording device that is equipped with a magnetic recording medium, the microwave assisted magnetic head relating to the above invention, and a positioning device that supports the microwave assisted magnetic head, and, that positions the microwave assisted magnetic head relative to the magnetic recording medium.

According to the present invention, a novel microwave assisted magnetic head; head gimbal assembly and magnetic recording device that can enhance magnetic field intensity is applied to a spin torque oscillator can be provided.

DETAILED DESCRIPTION OF THE INVENTION

Prior to explaining an embodiment of the present invention, terms used in the present specification are defined. In a lamination structure or an element structure formed on an element formation surface of a slider substrate in the microwave assisted magnetic head relating to the present embodiment, a substrate side viewed from a layer or an element to be a reference is referred to as the "lower side," and its opposite side is referred to as the "upper side." Further, an air bearing surface side viewed from a layer or an element to be a reference is referred to as the "front side" and its opposite side is referred to as the "back side" or "rear side." In addition, in the microwave assisted magnetic head relating to the present embodiment, "X-, Y- and Z-axis directions" are defined in some drawings as needed. Here, the Z-axis direction is the "upper and lower directions" as mentioned above, and +Z side is equivalent to a trailing side, and −Z side is equivalent to the leading side. Further, the Y-axis direction is a track width direction, and the X-axis direction is the height direction.

[Magnetic Recording Device]

Figure 1:
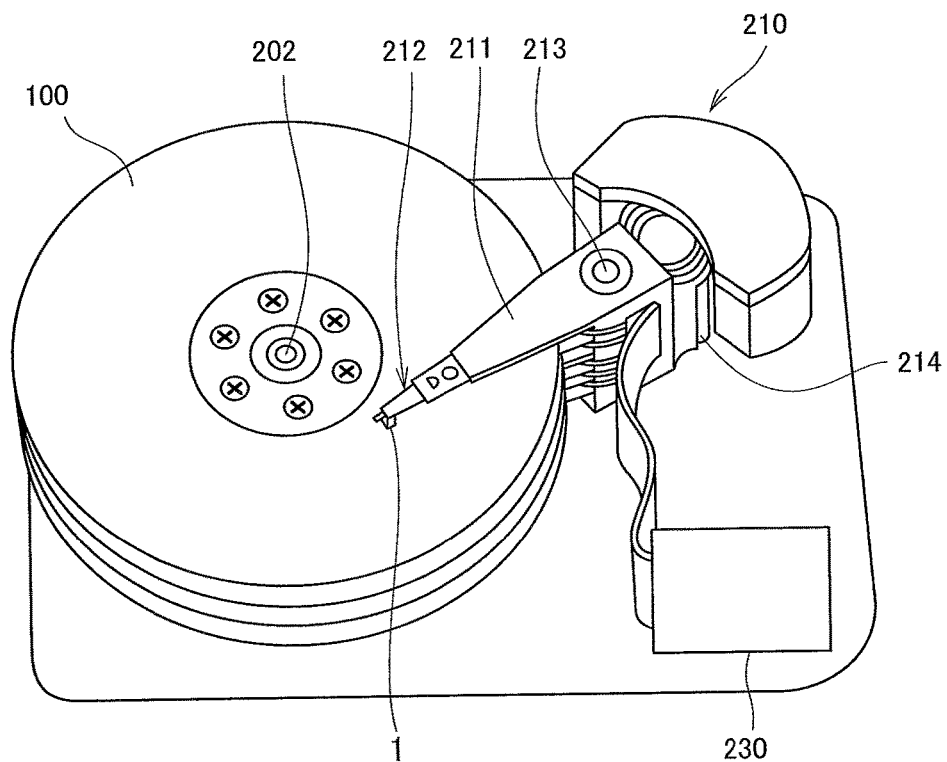
FIG. 1 is a perspective view roughly showing a magnetic recording device in one embodiment of the present invention.
Figure 2:
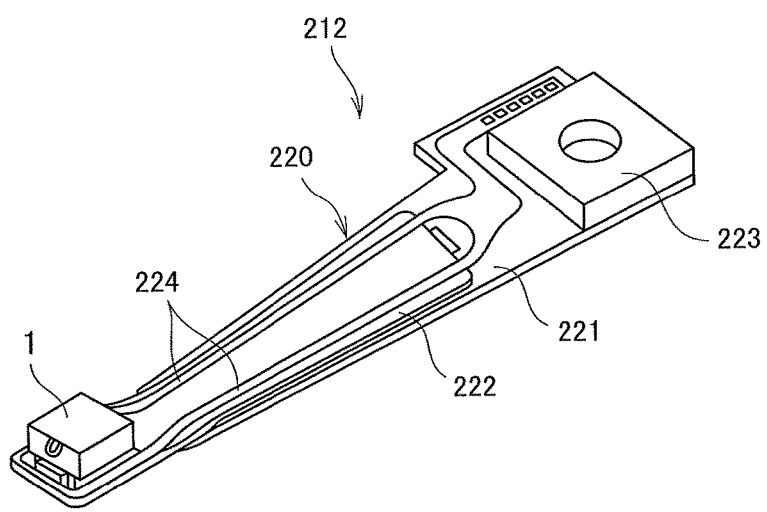
FIG. 2 is a perspective view roughly showing a head gimbal assembly (HGA) in one embodiment of the present invention.
Figure 3:
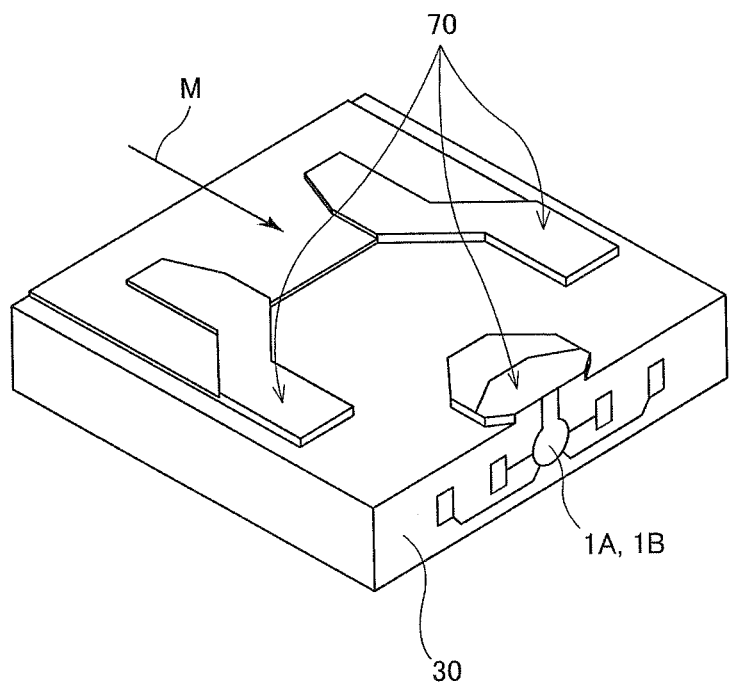
FIG. 3 is a perspective view schematically showing an overall structure of a microwave assisted magnetic head relating to one embodiment of the present invention.

FIG. 1 is a perspective view roughly showing a magnetic recording device where a microwave assisted magnetic head in the present embodiment is mounted; FIG. 2 is a perspective view roughly showing a head gimbal assembly (HGA) that is equipped with the microwave assisted magnetic head in the present embodiment; and FIG. 3 is a perspective view schematically showing the overall configuration of the microwave assisted magnetic head in the present embodiment.

As shown in FIG. 1, the magnetic recording device in the present embodiment is equipped with a plurality of magnetic disks 100 that rotate around the axis of rotation of a spindle motor 202, respectively; an assembly carriage device 210 where a plurality of drive arms 211 are disposed; head gimbal assemblies (HGA) 212 that are mounted at the front end portions of the drive arms, and that have the microwave assisted magnetic head 1, respectively; and a control circuit 230 that controls writing and reading actions of the microwave assisted magnetic head 1.

In the present embodiment, the magnetic disk 100 as a magnetic recording medium is for perpendicular magnetic recording, and has a structure where a soft magnetic under layer, an intermediate layer, a magnetic recording layer (perpendicular magnetization layer) and the like are laminated in respective order, for example, on a disk substrate.

The assembly carriage device 210 is a device for positioning the microwave assisted magnetic head 1 on a track where recording bits of the magnetic disk 100 are aligned. In the assembly carriage device 210, the drive arms 211 are stacked in the direction along a pivot bearing shaft 213, and are configured to be angularly swingable centering on the pivot bearing shaft 213 by a voice coil motor (VCM) 214.

Furthermore, the structure of the magnetic recording device in the present embodiment is not limited to the structure mentioned above, but the magnetic disks 100, the drive arms 211, the HGAs 212 and the microwave assisted magnetic heads 1 may be one, respectively.

In the HGA 212 shown in FIG. 2, a suspension 220 has a load beam 221; a flexure 222 that is attached to the load beam 221, and that has elasticity; and a base plate 223 disposed in a base of the load beam 221. Further, a wiring member 224 including a lead conductor and a connection pad that is electrically connected to the both ends of the lead conductor is disposed on the flexure 222. A magnetic head slider 30 (see FIG. 3) that is equipped with the microwave assisted magnetic head 1 in the present embodiment is attached to the flexure 222 at the front end portion of the suspension 220 so as to oppose the surfaces of the magnetic disks 100 at a predetermined space (flying height).

In addition, one end of the wiring member 224 is electrically connected to a terminal electrode of the microwave assisted magnetic head 1 in the present embodiment. Furthermore, the structure of the suspension 220 in the present embodiment is not limited to the structure above.

As shown in FIG. 3, the magnetic head slider 30 has an air bearing surface (ABS) 70 that is directly involved with the flying characteristics, and is equipped with the microwave assisted magnetic head 1 at a side surface end (side surface end at the back side) in the traveling direction M of the magnetic disk 100 (the same direction as air flow). The microwave assisted magnetic head 1 is equipped with the recording head 1B and the reproducing head 1A.

[Microwave Assisted Magnetic Head]

Figure 4:
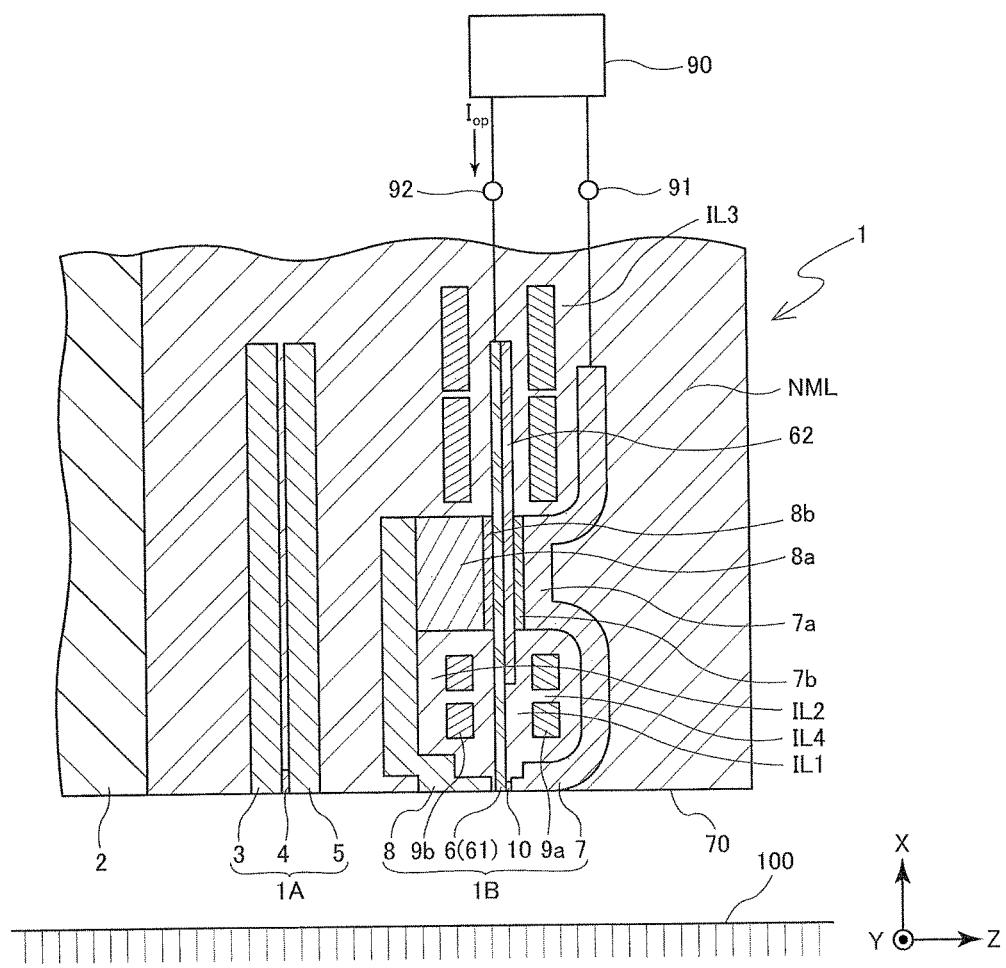
FIG. 4 is a cross-sectional view (XZ plane) roughly showing a configuration of a main section of the microwave assisted magnetic head relating to one embodiment of the present invention.

Next, the microwave assisted magnetic head in the present embodiment is explained with reference to the drawings. FIG. 4 is a cross-sectional view (XZ cross-sectional view) along a direction that crosses the ABS, which is an air bearing surface of the microwave assisted magnetic head in the present embodiment.

As shown in FIG. 4, the microwave assisted magnetic head 1 in the present embodiment has a slider substrate 2, and the reproducing head 1A and the recording head 1B laminated on an element formation surface of the slider substrate 2. Further, the microwave assisted magnetic head 1 has the ABS 70, which is an air bearing surface opposite to the magnetic disk 100.

The reproducing head 1A has an MR element 4 that is arranged in the vicinity of the ABS 70 for detecting a signal magnetic field from the magnetic disk 100, and the lower-side shield layer 3 and the upper-side shield layer 5 that are formed on the element formation surface of the slider substrate 2 and are made from a magnetic material.

The lower-side shield layer 3 and the upper-side shield layer 5 are disposed for the purpose of preventing the MR element 4 from receiving an external magnetic field such as noise. The lower-side shield layer 3 and the upper-side shield layer 5 are magnetic layers that are formed, for example, using a frame plating method, a sputtering method or the like, and that are made from a magnetic material. The lower-side shield layer 3 and the upper-side shield layer 5 are made from soft magnetic materials, for example, NiFe (permalloy), FeSiAl (Sendust), CoFeNi, CoFe, FeN, FeZrN or CoZrTaCr or the like, or, multilayer film of these materials or the like. The thickness of the lower-side shield layer 3 and the upper-side shield layer 5 is, for example, approximately 0.1 μm to 3 μm, respectively.

The MR element 4 is a magnetic sensor that detects a signal magnetic field by utilizing the MR effects, and for example, may be any of a Current In Plane-Giant Magneto-Resistive (CIP-GMR) multilayer body by utilizing an in-plane current-passage type giant magneto-resistive effect, a Current Perpendicular to Plane-Giant Magneto-Resistive (CPP-GMR) multilayer body by utilizing a perpendicular current-passage type giant magneto-resistive effect and a Tunneling Magneto-Resistive (TMR) multilayer body by utilizing a tunnel magneto-resistive effect.

The MR element 4 utilizing these MR effects can perceive a signal magnetic field from the magnetic disk 100 with a high sensitivity. Furthermore, if the MR element 4 is a CPP-GMR multilayer body or a TMR multilayer body, the lower-side shield layer 3 and the upper-side shield layer 5 can fulfill a role as an electrode as well. In the meantime, if the MR element 4 is the CIP-GMR multilayer body, an insulating layer is disposed between the MR element 4 and the lower-side shield layer 3, and between the MR element 4 and the upper-side shield layer 5, and an MR lead layer that is electrically connected to the MR element 4 is further disposed.

The recording head 1B is for perpendicular magnetic recording, and has a magnetic pole layer 6, a trailing shield 81, a leading shield 84, a spin torque oscillator (STO) 10 positioned in the gap (write gap) between the main magnetic pole layer 6 and the trailing shield 81, and a first coil 9a and a second coil 9b.

The main magnetic pole layer 6 constitutes a magnetic guide path for guiding magnetic flux, which has been generated by applying a writing current to the first coil 9a and the second coil 9b, while focusing on a magnetic recording layer (perpendicular magnetic layer) of the magnetic disk to be written.

The main magnetic pole layer 6 extends rearward in the height direction from the ABS 70, and includes a main magnetic pole part 61 and an auxiliary magnetic pole part 62. The main magnetic pole part 61 and the auxiliary magnetic pole part 62 can be arranged upside down (Z direction) depending upon the design specifications.

Figure 5:
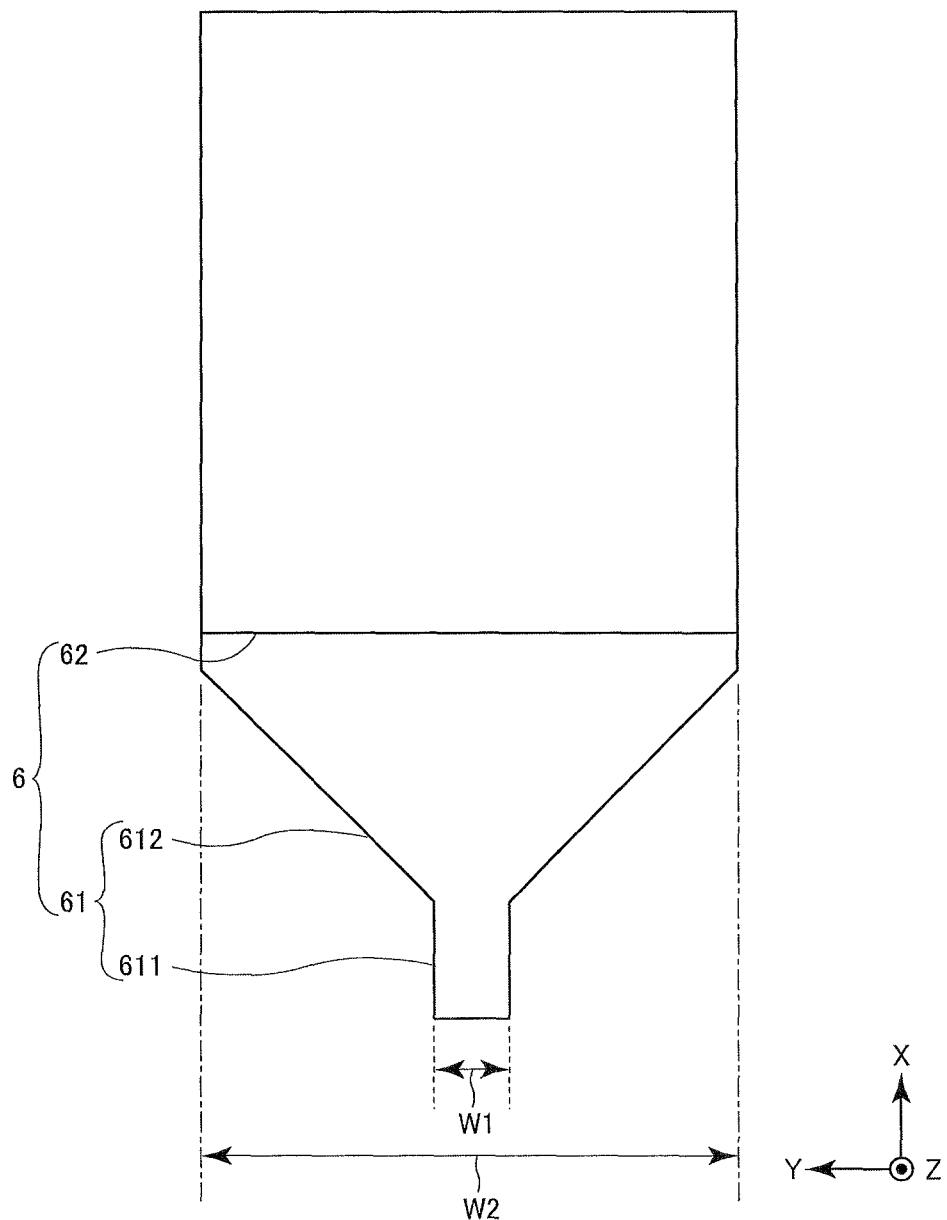
FIG. 5 is a plan view roughly showing a main magnetic pole layer in a magnetic head of the microwave assisted magnetic head relating to one embodiment of the present invention.

The auxiliary magnetic pole part 62 extends toward the height direction from a recessed position from the ABS 70. This auxiliary magnetic pole part 62 is arranged, for example, at the leading side relative to the main magnetic pole part 61, and, as shown in FIG. 5, has a rectangular type planar shape (width W2). The auxiliary magnetic pole part 62, as described above, may be arranged at the trailing side of the main magnetic pole part 61.

The main magnetic pole part 61 extends rearward in the height direction from the ABS 70. The main magnetic pole part 61, for example, as shown in FIG. 5, includes a first magnetic pole part 611 that extends rearward in the height direction from the ABS 70, and that has narrow width, and a second magnetic pole part 612 that continues to the back side of the first magnetic pole part 611, and that has a wide width.

The first magnetic pole part 611 is a part where magnetic flux is primarily emitted, and has a constant width W1 to regulate the recording track width. The second magnetic pole part 612 is a part that supplies a magnetic flux to the first magnetic pole part 611, and has a width W2 that is greater than the width W1 of the first magnetic pole part 611. The width W2 of the second magnetic pole part 612 becomes gradually narrower as approaching the first magnetic pole part 611 at the front side in the height direction. Because the first magnetic pole part 611 has smaller width W1, it becomes possible to generate a minute writing magnetic field, and it becomes possible to set the track width to a minute value corresponding to high recording density.

Figure 7A:
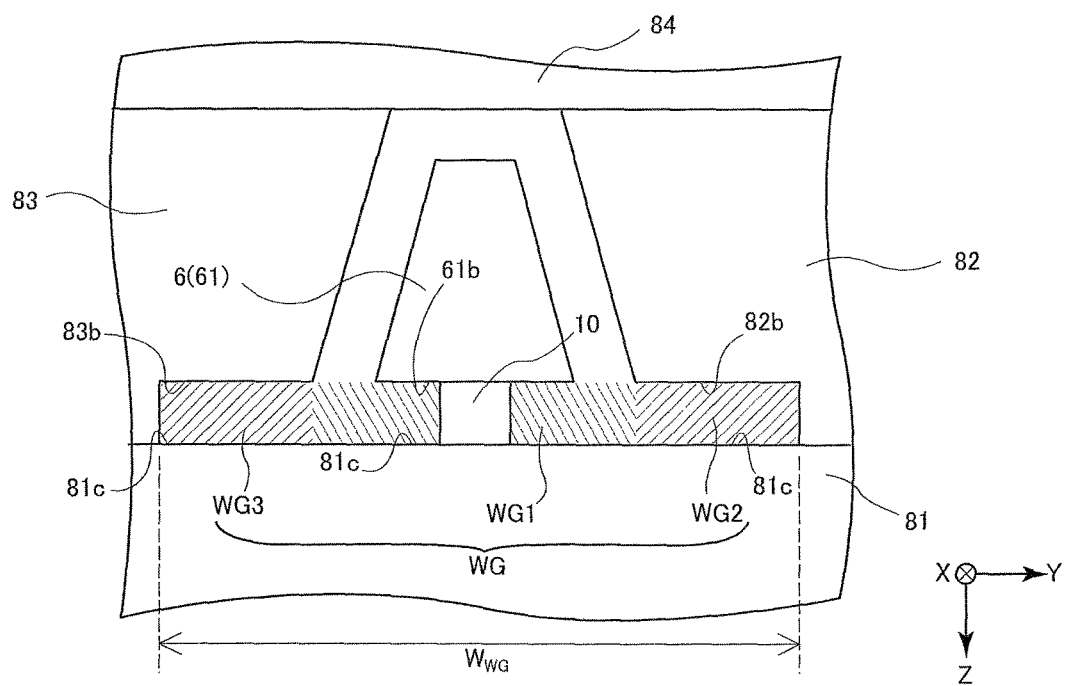
FIG. 7A is a plan view showing a schematic configuration of a first mode of the recording head of the microwave assisted magnetic head relating to one embodiment of the present invention, viewed from an ABS side.
Figure 7B:
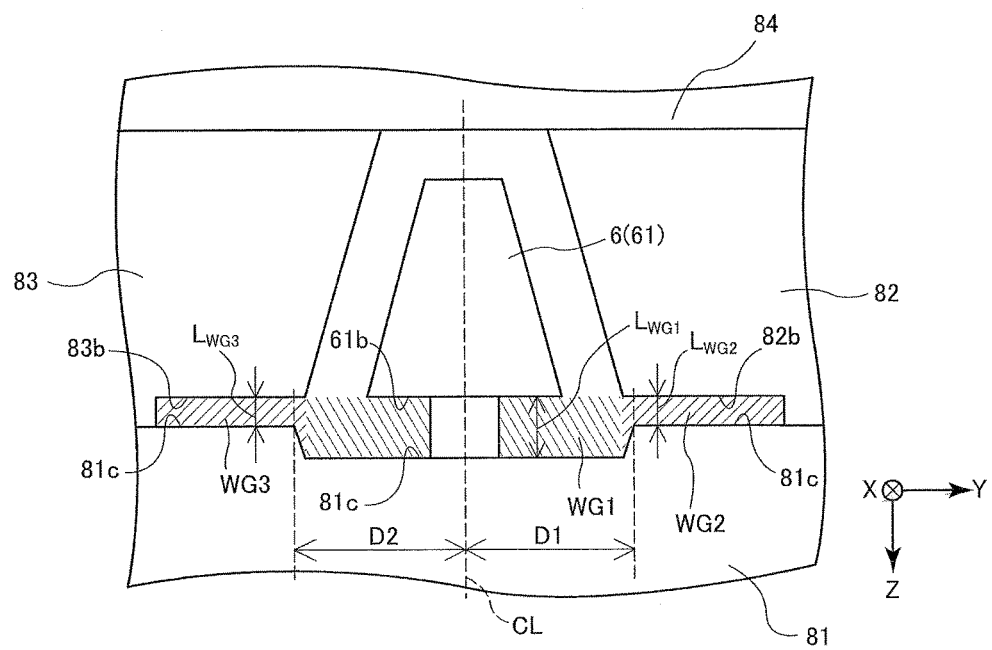
FIG. 7B is a plan view showing a schematic configuration of a second mode of the recording head of the microwave assisted magnetic head relating to one embodiment of the present invention, viewed from the ABS.
Figure 7C:
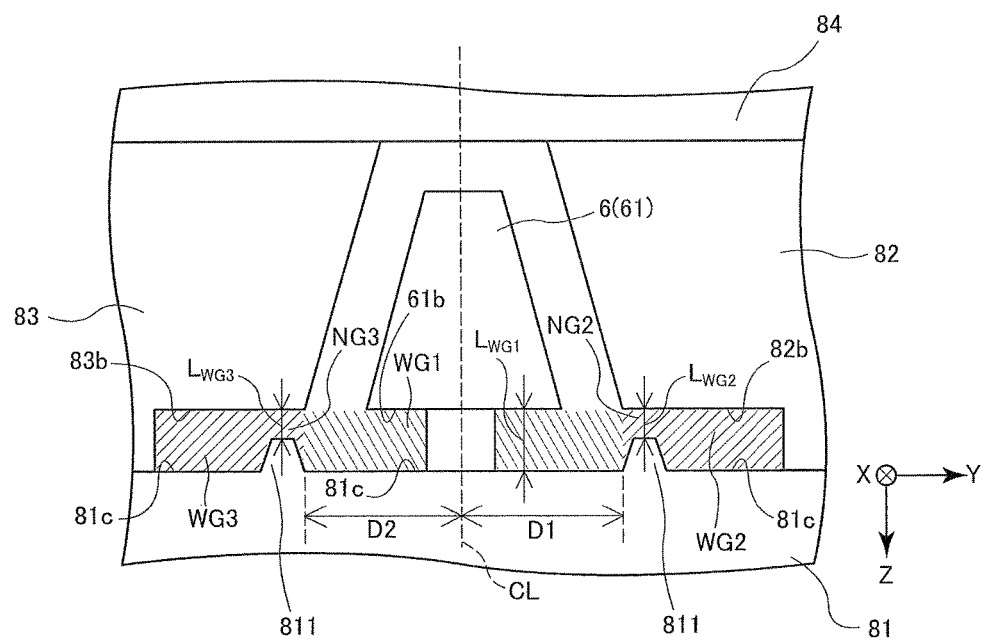
FIG. 7C is a plan view showing a schematic configuration of a third mode of the recording head of the microwave assisted magnetic head relating to one embodiment of the present invention, viewed from the ABS.

The main magnetic pole part 61 on the ABS 70, for example, has a so-called reverse trapezoid-shaped end surface 61a where its upper edge side (+Z side) is wider than its lower edge side (−Z side) and its width becomes narrower toward the lower direction (−Z direction) (see FIGS. 7A to 7C).

The main magnetic pole layer 6 (the main magnetic pole part 61 and the auxiliary magnetic pole part 62) is made from a soft magnetic material having high saturation magnetic flux density and, for example, it can be made from a soft magnetic material, which is an iron-based alloy material (such as FeNi, FeCo, FeCoNi, FeN or FeZrN). The main magnetic pole part 61 and the auxiliary magnetic pole part 62 can constitute separate bodies, made from different soft magnetic materials, respectively. For example, the main magnetic pole part 61 can be made from a soft magnetic material having higher saturation magnetic flux density than the auxiliary magnetic pole part 62.

Figure 6:
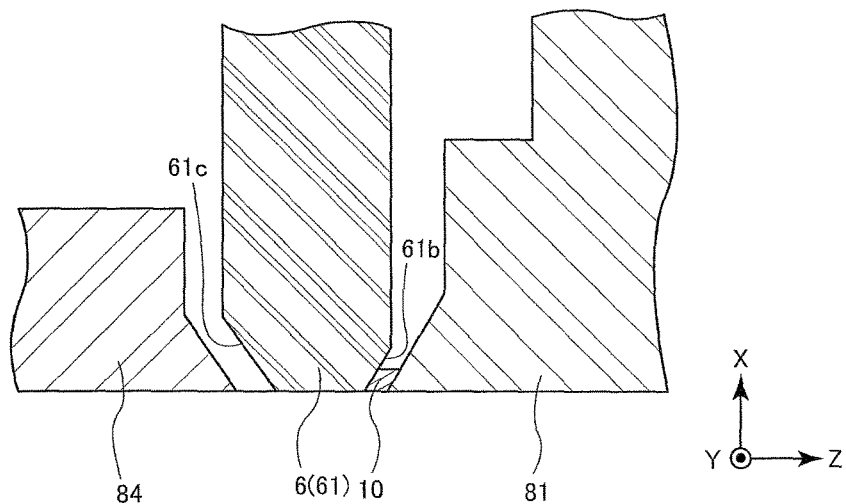
FIG. 6 is a partially-enlarged cross-sectional view showing a schematic configuration of the recording head of the microwave assisted magnetic head relating to one embodiment of the present invention.

As shown in FIG. 6, the trailing side (+Z side) end surface 61b and leading side (−Z side) end surface 61c positioned in the vicinity of the ABS 70 and are configured to be taper-shaped so as to gradually reduce the thickness of the main magnetic pole part 61 (thickness in the Z direction) toward the ABS 70. With this design, the recording magnetic flux emitting from the main magnetic pole part 61 (first magnetic pole part 611) can be further focused on the ABS 70.

As shown in FIGS. 7A to 7C, the main magnetic pole part 61 is surrounded by the trailing shield 81, side shields 82 and 83 that continue to the trailing shield 81 at both outer sides in the cross track direction, and the leading shield 84 that continues to the side shields 82 and 83. The trailing shield 81 is arranged at the trailing side of the main magnetic pole part 61 so as to interpose a write gap WG with the main pole part 61. The trailing shield 81, the side shields 82 and 83 and the leading shield 84 have a function to incorporate recording magnetic flux that is emitted and scatters from the main magnetic pole part 61. The trailing shield 81 reaches the ABS 70 and fulfills a role as a magnetic guide path of the magnetic flux that is returned from the soft magnetic under layer disposed under the recording layer (perpendicular magnetization layer) of the magnetic disk 100. The trailing shield 81, the side shields 82 and 83 and the leading shield 84 can be made from NiFe (permalloy) which has high saturation magnetic flux density or iron-based alloy materials or the like similar to the main magnetic pole layer 6.

The write gap WG has a shape that substantially linearly extends along the cross track direction between the main magnetic pole part 61 and the trailing shield 81, and is a gap positioned between trailing-side (+Z side) end surfaces 61b, 82b and 83b of the main magnetic pole part 61 and the side shields 82 and 83, and a leading-side (−Z side) end surface 81c of the trailing shield 81. The write gap WG opposes the trailing-side (+Z side) end surface 61b of the main magnetic pole part 61, and continues to a first write gap part WG1 positioned nearly in a center in the cross track direction and both ends of the first write gap WG1 in the cross track direction, respectively, and includes a second write gap WG2 and a third write gap WG3 extending outward along the cross track direction. The second write gap part WG2 and the third write gap part WG3 are positioned between the end surface 81c of the trailing shield 81 and the end surfaces 82b and 83b of the side shields 82 and 83 (space in the down track direction), respectively. Because the write gap WG continues to both ends of the first write gap part WG1 in the cross track direction, respectively, and includes the second write gap part WG2 and the third write gap part WG3 extending outward along the cross track direction, magnetic field intensity Hy and recording magnetic field gradient HGy in the down track direction can be improved. As a result, since the magnetic field intensity to be applied to the STO 10 disposed in the first write gap WG1 can be increased, the oscillation frequency at the STO 10 can be improved, and an assist effect by the microwave magnetic field can be improved. Further, as a result of improving recording magnetic field gradient HGy, the BPI can also be improved.

Length $W_{WG}$ of the write gap WG in the cross track direction is not particularly limited, but it is preferably 300 nm or greater, and is particularly preferably 500 to 2,500 nm. If the length $W_{WG}$ is 300 nm or greater, the magnetic field intensity Hy and the recording magnetic field gradient HGy in the down track direction can be improved. If the length exceeds 2,500 nm, a further improved effect of the recording magnetic field gradient HGy is not likely to be expected.

In the present embodiment, as shown in FIG. 7A, lengths $L_{WG1}$, $L_{WG2}$ and $L_{WG3}$ of the first write gap part WG1, the second write gap part WG2 and the third write gap part WG3 in the down track direction can be substantially the same with each other, but it is preferable that the lengths $L_{WG2}$ and $L_{WG3}$ of the second write gap part WG2 and the third gap part WG3 are at least partially shorter than the length $L_{WG1}$ of the first write gap WG1. Specifically, as shown in FIG. 7B, the second write gap part WG2 and the third write gap part WG3 may have substantially the same lengths $L_{WG2}$ and $L_{WG3}$ throughout nearly the entire region in the cross track direction, or as shown in FIG. 7C, may have portions of the second write gap part WG2 and the third write gap part WG3 include narrower gap parts NG2 and NG3 where portions of the lengths $L_{WG2}$ and $L_{WG3}$ are shorter than the length $L_{WG1}$ of the first write gap part WG1. Because the lengths $L_{WG2}$ and $L_{WG3}$ of the second write gap part WG2 and the third write gap part WG3 are at least partially shorter than the length $L_{WG1}$ of the first write gap WG1, the recording magnetic field gradient HGx in the cross track direction can be improved and the TPI can be improved, preventing erasure of signal(s) recorded in the adjacent track(s).

A ratio of the length $L_{WG1}$ of the first write gap part W1 to the lengths $L_{WG2}$ and $L_{WG3}$ of the second write gap part W2 and the third write gap part W3 is preferably 1:0.15 to 0.9, and is particularly preferably 1:03 to 0.7. If the ratio of the lengths is 1:less than 0.15, it becomes difficult to obtain an improved effect of the recording magnetic field gradient HGy in the down track direction, and it may be difficult to improve the BPI, and if it is 1:exceeding 0.9, even though the magnetic field intensity Hy can be improved, the recording magnetic field gradient HGy in the down track direction is likely to be saturated.

In the modes shown in FIGS. 7B and 7C, when viewed from the ABS 70 side, lengths D1 and D2 from a segment CL in parallel with the down track direction passing through the center of the main magnetic pole part 61 in the cross track direction to portions of the lengths $L_{WG2}$ and $L_{WG3}$ in the second write gap part WG2 and the third write gap part WG3 are preferably 120 nm or less, and more preferably 20 nm to 80 nm. If the lengths D1 and D2 exceed 120 nm, it may be difficult to improve the recording magnetic field gradient HGx in the cross track direction.

In the mode shown in FIG. 7C, in the trailing shield 81, because portions out of the leading-side end surface 81C have convex parts 811 toward the trailing-side end surfaces 82b and 83b of the side shields 82 and 83, narrower gap parts NG2 and NG3 with shorter lengths $L_{WG2}$ and $L_{WG3}$ of the second write gap part WG2 and the third write gap part WG3 are formed between the convex parts 811 and the side shields 82 and 83, respectively. The shape of the convex part 811 of the trailing shield 81 (a shape viewed from the ABS 70 side) is a nearly trapezoidal shape in the mode shown in FIG. 7C, but the shape is not limited to this and may be nearly semi-circular, nearly triangular, nearly rectangular or the like.

The STO 10 that generates a microwave magnetic field to be superimposed on the recording magnetic field from the main magnetic pole layer 6 (the main magnetic pole part 61) when writing is disposed in the write gap WG (first write gap part WG1) between the main magnetic pole part 61 and the trailing shield 81. Furthermore, details of the configuration of the STO 10 will be described later.

At the rear side in the height direction from the ABS 70, between the main magnetic pole layer 6 and the trailing shield 81, a first back gap layer 81b formed with an insulating body that electrically insulates them is arranged, and between the main magnetic pole layer 6 and the leading shield 84, a second back gap layer 84b that is formed with an insulating body that electrically insulates them is arranged.

First coils 9a and second coils 9b generate a magnetic flux for magnetic recording to the magnetic disk 100, and are made from for example, a highly conductive material, such as copper (Cu). The first coil 9a and the second coil 9b have a wound structure (spiral structure) that is wound centering on linkage parts 81a and 84a, the first back gap layer 81b and the second back gap layer 84b, respectively. The first coil 9a and the second coil 9b are configured to be a two-turn loop shape continuing from one end to the other end, respectively, and have a front turn portion at the nearly upper side of insulating layers IL1 and IL2, respectively.

A nonmagnetic layer NML is disposed in a part at a back side in the height direction from the front turn parts of the first coil 9a and the second coil part 9b, via an insulating layer IL3, respectively. This nonmagnetic layer NML is continuously disposed on the trailing shield 7, and reaches the ABS 70. The nonmagnetic layer NML primarily fulfills the function of a protective layer.

Furthermore, in the present embodiment, the number of turns of the first coil 9a and the second coil 9b is two, respectively, but the present invention is not limited to this mode and can be appropriately set within the range of one to four turns.

The first coil 9a and the second coil 9b have a plurality of turns, and it is desired that an insulating layer IL4 of a dry film is implanted in a wound coil crevice. It is preferable that the insulating layer IL4 of a dry film be made from a material, such as alumina formed using a so-called chemical vapor deposition (CVD) method. In order to assuredly fill and form the insulating layer IL4 of a dry film in the coil crevice, the coil shape is particularly important, and it is particularly desirable that a coil not be in an inverse tapered shape in the depth direction.

In the present embodiment, the main magnetic pole layer 6 (main magnetic pole part 61) and the trailing shield 81 are connected to a drive current circuit (power circuit) 90 for applying a drive current (direct current) $I_{op}$ to the STO 10 via terminals 91 and 92, respectively. The drive current (direct current) $I_{op}$ supplied from the drive current circuit 90 flows to the main magnetic pole layer 6 (main magnetic pole part 61), the STO 10 and the trailing shield 81 in respective order.

Because the drive current $I_{OP}$ flows, electrons are spin-polarized due to the magnetization of the SIL 12. If the spin polarization ratio of the SIL 12 is positive, spin electrons that have been polarized to a reverse direction from majority spins of the SIL 12 are reflected at/by the SIL 12, and are injected into the magnetic field generation layer 14. Because the reflected spin electrons function so as to counteract the dumping of the magnetization of the magnetic field generation layer 14, the precession movement of the magnetization of the magnetic field generation layer 14 is induced and a microwave magnetic field is generated from the magnetic field generation layer 14. Signals can be recorded into the magnetic disk 100 with great magnetic anisotropy energy Ku by superimposing this microwave magnetic field on the recording magnetic field from the main magnetic pole layer 6.

Furthermore, depending upon the layer configuration of the STO 10, the generation mechanism of the microwave magnetic field and/or the like, the drive current $I_{OP}$ may flow into the trailing shield 81, the STO 10 and the main magnetic pole layer 6 (main magnetic pole part 61) in respective order.

Figure 8:
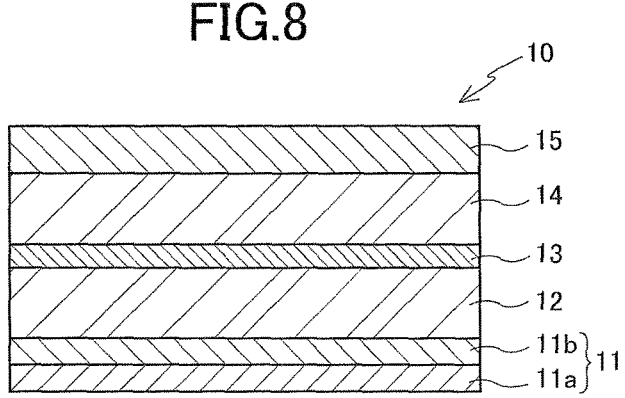
FIG. 8 is a cross-sectional view showing a schematic configuration of a spin torque oscillator in one embodiment of the present invention.

Details of the configuration of the STO 10 are explained hereafter with reference to FIG. 8.

As shown in FIG. 8, the STO 10 is a multilayer element where a base multilayer body 11 including a seed layer 11a and a buffer layer 11b, a spin injection layer (SIL) 12, a nonmagnetic spacer layer 13, a magnetic field generation layer 14 and a cap layer 15 made from Ru or the like with approximately 0.5 to 20 nm of thickness are laminated in respective order. In the STO 10, precession movement of the magnetization of the magnetic field generation layer 14 occurs when a direct current is applied from the base multilayer body 11 side toward the cap layer 15 side, and a high-frequency magnetic field (microwave magnetic field) can be generated from the magnetic field generation layer 14.

The seed layer 11a is an alloy layer having an amorphous structure or a microcrystal structure containing tantalum (Ta) and at least one more type of metal. As the other metal, a 3d transition metal can be exemplified, and specifically, this is at least one type of metal to be selected from a group constituting vanadium (V), titanium (Ti), chrome (Cr), manganese (Mn), iron (Fe), nickel (Ni) and copper (Cu), and it is preferably iron (Fe), cobalt (Co) or nickel (Ni). It is preferable that the film thickness of the seed layer 11a be 0.4 nm to 5 nm, and it is more preferable that it is 0.8 nm to 3 nm. Even if the film thickness of the seed layer 11a is within the range above, the high perpendicular magnetic anisotropy can be induced to the SIL 12.

The buffer layer 11b is an alloy layer having a [001] plane orientation hexagonal close-packed structure, and containing at least one type of group 6 metal in the periodic table and at least one type of group 9 metal in the periodic table. Because the buffer layer 11b is an alloy layer containing the group 6 metal(s) and the group 9 metal(s), the buffer layer 11b can have a [001] plane orientation hexagonal close-packed structure, crystallizability and orientation of the SIL 12 laminated on the buffer layer 11b can be excellent, and a film that excels in the orientation even it is a thin film can be realized.

As the group 6 metal(s) constituting the buffer layer 11b, for example, chrome (Cr), molybdenum (Mo), tungsten (W) and the like are exemplified, and as the group 9 metals, for example, cobalt (Co), rhodium (Rh), iridium (Ir) and the like are exemplified. The buffer layer 11b is preferably an alloy layer containing chrome (Cr) as the group 6 metal and containing cobalt (Co), rhodium (Rh) or iridium (Ir) as the group 9 metal, among these. The film thickness of the buffer layer 11b is preferably 0.4 nm to 5 nm, and is more preferably 0.8 nm to 3 nm.

The SIL 12 is a ferromagnetic layer having perpendicular magnetic anisotropy in a perpendicular direction relative to a film surface, and is composed of a multilayer film with magnetic bodies, such as $[CoFe/Ni]_n$, $[Co/Pt]_n$ or $[Co/Pd]_n$, or a multilayer film with a magnetic body and a nonmagnetic body. Furthermore, "n" is the number of repeated laminations of the lamination structure indicated within the brackets. Further, as materials constituting the SIL 12, an alloy having perpendicular magnetic anisotropy, such as CoPt, FePt or MnGa, is usable, as well. When the SIL 12 constitutes $[CoFe/Ni]_n$, it is preferable that the film thickness of Ni is the same or thicker than that of CoFe. The film thickness of CoFe is preferably 0.1 nm to 1 nm, and is more preferably 0.1 nm to 0.4 nm. The film thickness of Ni is preferably 0.2 nm to 1.5 nm, and is more preferably 0.2 nm to 0.6 nm. The number of repeated laminations n in the lamination structure is preferably 2 to 40, and is more preferably 2 to 20. The SIL 12 is a layer that fulfills a role to spin-polarize electrons by applying a current in the lamination direction of the STO 10, and to inject the electrons to the magnetic field generation layer 14. The film thickness of the SIL 12 is preferably 0.6 nm to 15 nm, and is more preferably 1 nm to 10 nm. In order to increase a spin polarization ratio by the SIL 12, a magnetic body layer 16 with a higher spin polarization ratio may exist between the SIL 12 and a nonmagnetic spacer layer 13. In particular, if the SIL 12 is made from $[CoFe/Ni]_n$, it is preferable to have a magnetic body layer 16 because of the presence of Ni with a small spin polarization ratio. As a material constituting such a magnetic body layer 16, soft magnetic alloys, such as CoFe or CoFeB, Co-based heusler alloys, such as $Co_2MnSi$ or $Co_2FeSi$, materials having negative spin polarization, such as FeCr or FeV, and the like can be exemplified. The film thickness of the magnetic body layer 16 is preferably 0.1 nm to 8 nm, and more preferably 0.4 nm to 4 nm.

The nonmagnetic spacer layer 13 may be made from a nonmagnetic metal with high spin permeability, such as Cu, Ag, Au, Cr or Al, and may be a tunnel barrier layer, such as an MgO layer or an $Al_2O_3$ layer. The film thickness of the nonmagnetic spacer layer 13 is set, for example, at approximately 0.5 nm to 5 nm, and can be preferably set at approximately 1.5 nm to 3 nm. Because the film thickness of the nonmagnetic spacer layer 13 is within the range above, an exchange coupling between the SIL 12 and the magnetic field generation layer 14 can be optimally adjusted.

The magnetic field generation layer 14 is a ferromagnetic layer made from a material where its direction of magnetization under an initial condition (a condition where no current flows and no magnetic field is applied) is nearly in parallel with the film surface. The greater the saturation magnetization Ms ($emu/cm^3$) of the magnetic field generation layer 14 becomes and the thicker the film thickness becomes, the more the intensity of the microwave magnetic field to be generated is increased. Thus, it is preferable that the magnetic field generation layer 14 is made from a material with greater saturation magnetization Ms and the film thickness is thicker within a predetermined range accommodated in the first write gap WG1 (see FIGS. 7A to 7C). As the constituent material of the magnetic field generation layer 14, for example, soft magnetic materials, such as $[FeCo/Ni]_m$, FeCo, FeCoAl, FeCoSi, FeCoB or FeNi; CoIr having negative perpendicular magnetic anisotropy, $[Fe/Co]_m$ and the like are exemplified. Furthermore, "m" is the number of repeated laminations of the lamination structure indicated within the brackets. If $[FeCo/Ni]_m$ is used as a constituent material of the magnetic field generation layer 14, it is preferable that the film thickness of the FeCo be thicker than that of Ni, and the film thickness of FeCo is preferably 0.4 nm to 4 nm, and is more preferably 0.8 nm to 2 nm, and the film thickness of Ni is preferably 0.1 nm to 1 nm, and is more preferably 0.1 nm to 0.5 nm. The number of repeated laminations m of the lamination structure is preferably 1 to 20, and is more preferably 3 to 10. The film thickness of the magnetic field generation layer 14 is approximately 2 nm to 20 nm, and is more preferably 5 nm to 15 nm.

In the microwave assisted magnetic head 1 described above, because the write gap WG has the first write gap part WG1 positioned between the main magnetic pole layer 6 (the main magnetic pole part 61) and the trailing shield 81, and the second write gap part WG2 and the third write gap part WG3 that are continued to both ends in the cross track direction, respectively, the magnetic field intensity Hy and the recording magnetic field gradient HGy in the down track direction can be improved. As a result, the oscillation frequency of the STO 10 can be improved, a microwave magnetic field that can obtain a sufficient assist effect can be generated, and the BPI can be improved. Further, because the second write gap part WG2 and the third write gap part WG3 have portions where the lengths $L_{WG2}$ and $L_{WG3}$ in the down track direction are shorter than the first write gap WG1, the recording magnetic field gradient HGx in the cross track direction can be improved. As a result, the TPI can be improved. Therefore, according to the microwave assisted magnetic head 1 relating to the present embodiment, signals can be recorded to a magnetic recording medium with great coercive force at high recording density.

The embodiment explained above was described to facilitate the understanding of the present invention, but not to restrict the present invention. Therefore, each element disclosed in the embodiment is a concept including all design changes and equivalents in the technical scope of the present invention.

Figure 9A:
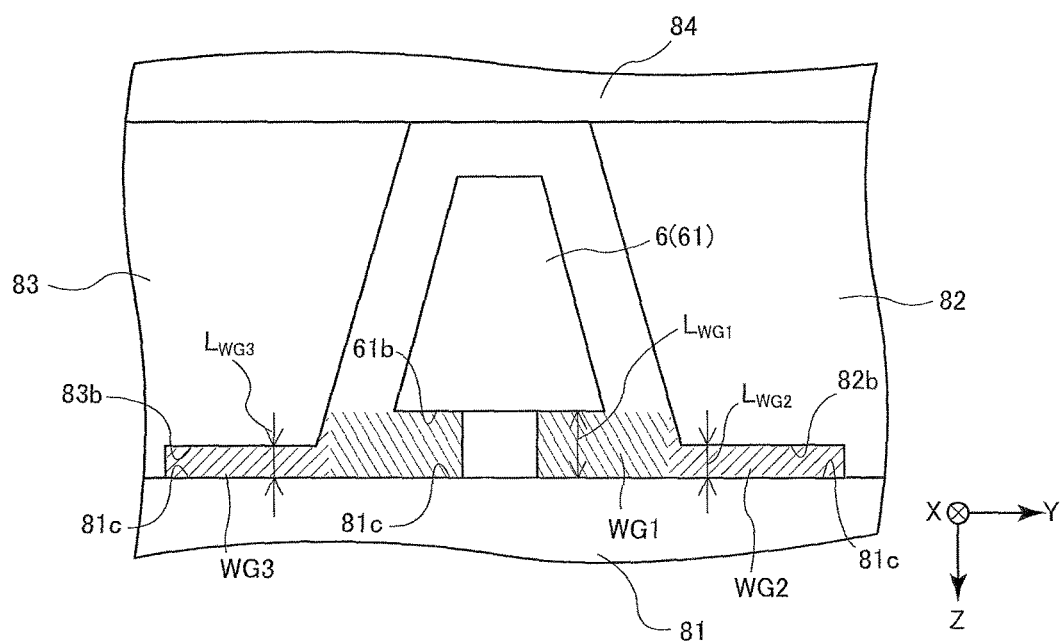
FIG. 9A is a plan view showing a schematic configuration of a variation of the first mode of the recording head of the microwave assisted magnetic head relating to one embodiment of the present invention, viewed from the ABS side.
Figure 9B:
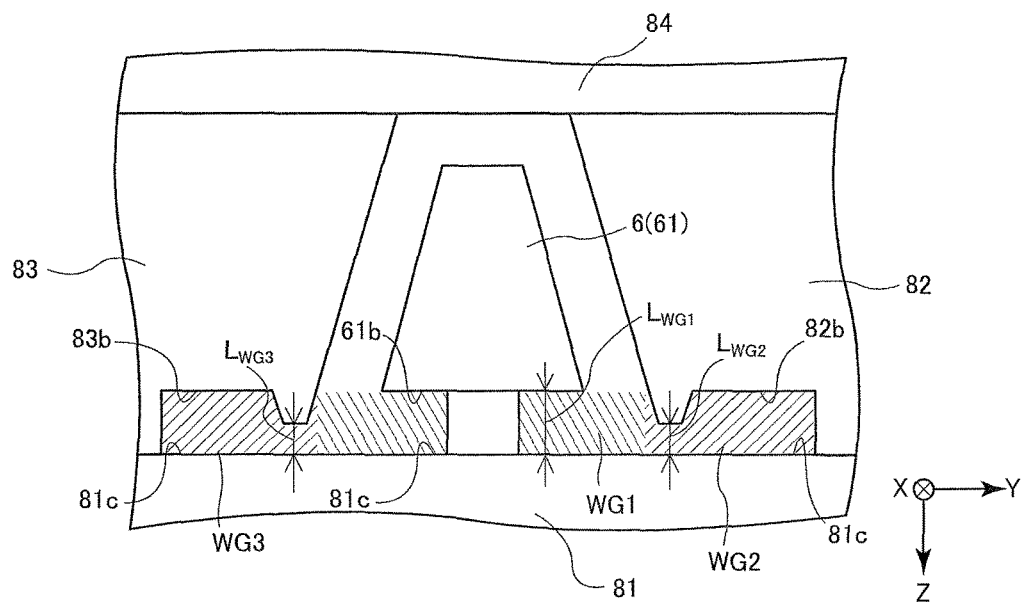
FIG. 9B is a plan view showing a schematic configuration of a variation of the second mode of the recording head of the microwave assisted magnetic head relating to one embodiment of the present invention, viewed from the ABS side.

In the embodiment above, because the leading-side (−Z side) end surface 81c of the trailing shield 81 is configured closer to the side shields 82 and 83, the narrower gap parts NG2 and NG3 where the lengths LWG2 and LWG3 of the second write gap part WG2 and the third write gap part WG3 are shorter are configured (see FIGS. 7B and 7C), but the present invention is not limited to such a mode. For example, as shown in FIGS. 9A and 9B, the narrower gap parts NG2 and NG3 where the lengths $L_{WG2}$ and $L_{WG3}$ of the second write gap part WG2 and the third write gap part WG3 are shorter may be configured by configuring the trailing-side (+Z side) end surfaces 82b and 83b of the side shields 82 and 83 closer to the trailing shield 81.

EXAMPLES

Hereafter, the present invention is explained in further detail by exemplifying examples, but the present invention is not limited by the examples below.

Experimental Example 1

Example 1

Using an analytical model of the microwave assisted magnetic head 1 having the configuration shown in FIG. 4 and FIG. 7A, a magnetic field intensity distribution within the first write gap part WG1 (a magnetic field intensity distribution to be applied to the STO 10), a magnetic field intensity Hy (Oe) and the recording magnetic field gradient HGy (Oe/nm) in the down track direction and the recording magnetic field gradient HGx (Oe/nm) in the cross track direction were obtained by simulation. This simulation analysis experiment was conducted using a three-dimensional finite-difference time-domain method (FDTD method), which is an electromagnetic field analysis.

As the microwave assisted magnetic head 1, a model where the main magnetic pole layer 6 (the main magnetic pole part 61) was formed with CoFe, and the trailing shield 81, the side shields 82 and 83 and the leading shield 84 were formed with NiFe, was adopted.

In the model above, the length $W_{WG}$ of the write gap WG in the cross track direction was adjusted to 500 nm, and the lengths $L_{WG1}$ to $L_{WG3}$ of the first to third write gap parts WG1 to WG3 in down track direction were adjusted to 30 nm, respectively. Simulation results are shown in FIG. 10A and FIGS. 11 to 14.

Example 2

Using the analytical model of the microwave assisted magnetic head 1 having the configuration shown in FIGS. 4 and 7B except for adjusting the lengths $L_{WG2}$ and $L_{WG3}$ of the second write gap part WG2 and the third write gap part WG3 in the down track direction at 20 nm and the lengths D1 and D2 at 40 nm, the magnetic field intensity distribution within the first write gap part WG1 (the magnetic field intensity distribution to be applied to the STO 10), the magnetic field intensity Hy (Oe) and the recording magnetic field gradient HGy (Oe/nm) in the down track direction and the recording magnetic field gradient HGx (Oe/nm) in the cross track direction were obtained by simulation as similar to Example 1. Simulation results are shown in FIG. 10B and FIGS. 11 to 14.

Example 3

Figure 12:
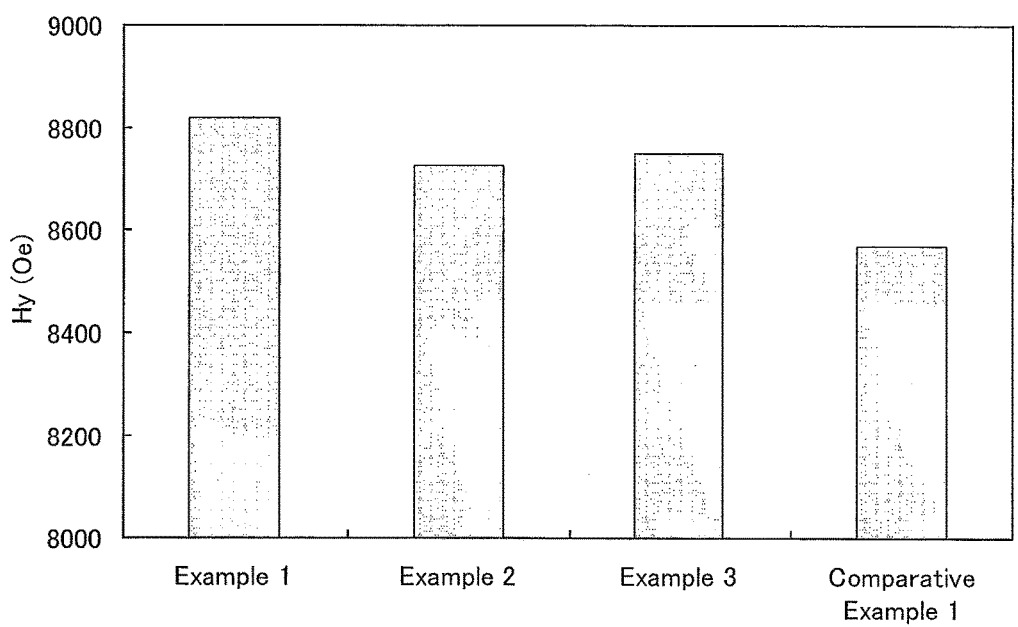
FIG. 12 is a graph showing magnetic field intensity in the down track direction in Examples 1 to 3 and Comparative Example 1.
Figure 13:
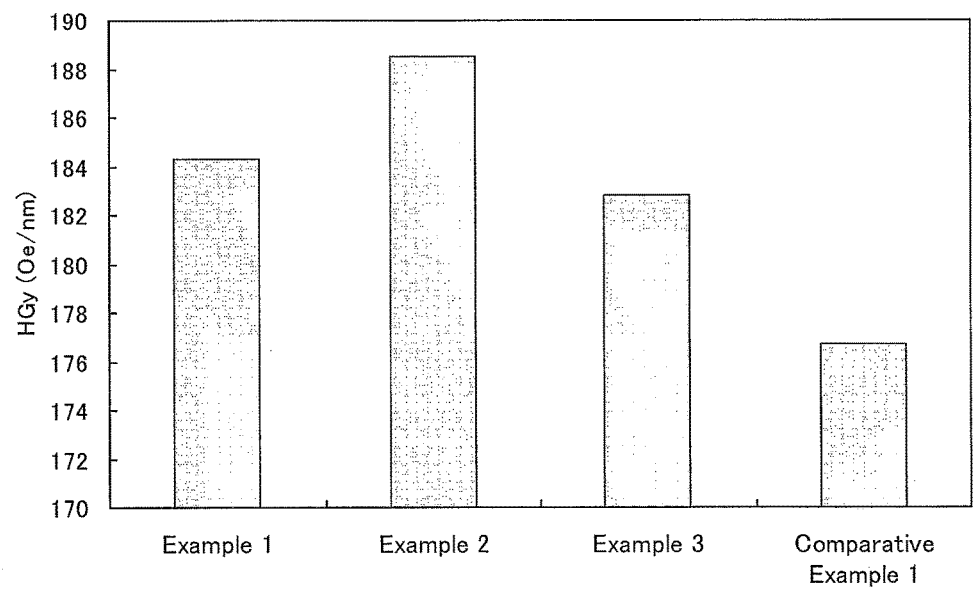
FIG. 13 is a graph showing recording magnetic field gradient in the down track direction in Examples 1 to 3 and Comparative Example 1.

Using the analytical model of the microwave assisted magnetic head 1 having a similar configuration to that in Example 1 except for the length $W_{WG}$ of the write gap WG being adjusted in the cross track direction to 1,500 nm, the magnetic field intensity Hy (Oe) and the recording magnetic field gradient HGy (Oe/nm) in the down track direction were obtained by simulation similar to Example 1. Simulation results are shown in FIGS. 12 and 13.

Comparative Example 1

Using the analytical model of the microwave assisted magnetic head 1 having a similar configuration to that in Example 1 except that the second write gap part WG2 and the third write gap part WG3 are not included, the magnetic field intensity Hy (Oe) and the recording magnetic field gradient HGy (Oe/nm) in the down track direction were obtained by simulation similar to Example 1. Simulation results are shown in FIGS. 12 and 13.

Example 4

Figure 14:
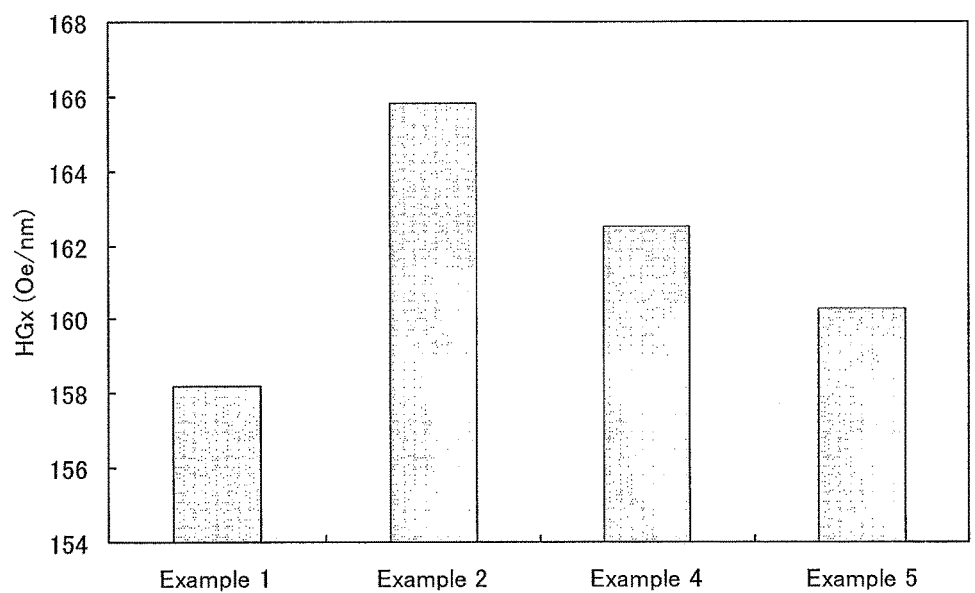
FIG. 14 is a graph showing the recording magnetic field gradient in the cross track direction in Example 1, Example 2, Example 4 and Example 5.
Figure 15:
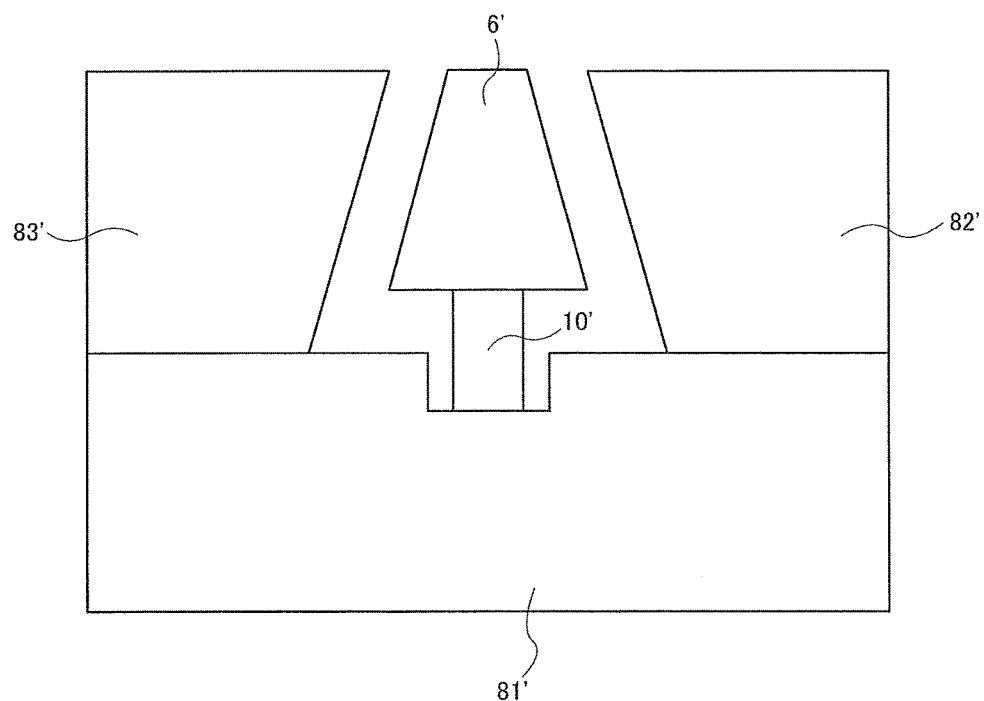
FIG. 15 is a plan view showing a schematic configuration of the recording head of a conventional microwave assisted magnetic head, viewed from the ABS side.

Using the analytical model of the microwave assisted magnetic head 1 having a similar configuration to that in Example 2 except for adjusting the lengths D1 and D2 being adjusted to 80 nm, the recording magnetic field gradient HGx (Oe/nm) in the cross track direction was obtained by simulation similar to Example 1. Simulation results are shown in FIG. 14.

Example 5

Using the analytical model of the microwave assisted magnetic head 1 having a similar configuration to that in Example 2 except that the lengths D1 and D2 were adjusted to 20 nm, the magnetic field intensity Hx (Oe) and the recording magnetic field gradient HGx (Oe/nm) in the cross track direction were obtained by simulation similar to Example 1. Simulation results are shown in FIG. 14.

Figure 10A:
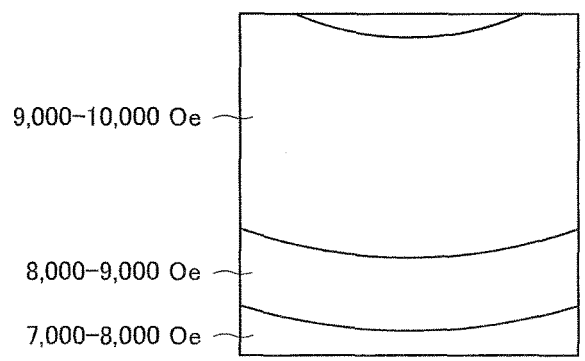
FIG. 10A is a distribution chart showing a magnetic field intensity distribution at a first write gap in Example 1.
Figure 10B:
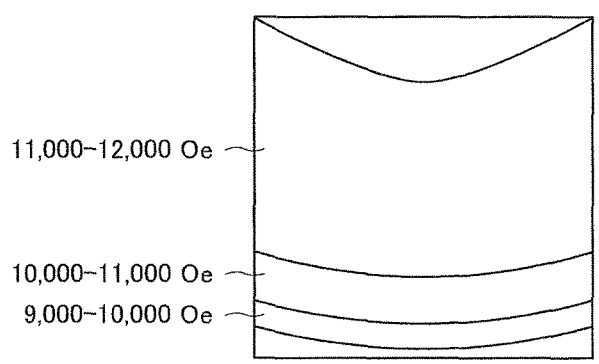
FIG. 10B is a distribution chart showing a magnetic field intensity distribution at a first write gap in Example 2.
Figure 11:
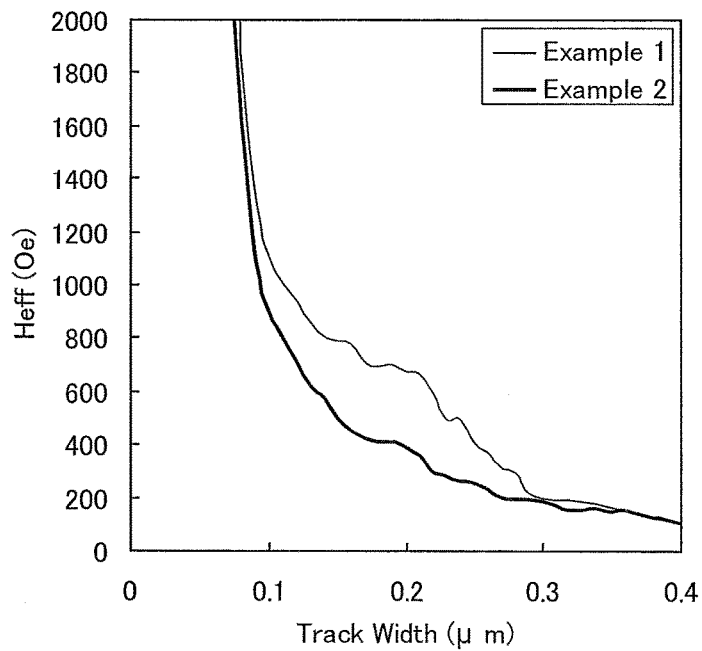
FIG. 11 is a graph showing an effective magnetic field intensity distribution in the cross track direction in Example 1 and Example 2.

FIGS. 10A and 10B are distribution charts showing the magnetic field intensity distribution at the first write gap WG1 in Example 1 and Example 2. FIG. 11 is a graph showing the effective magnetic field intensity Heff (Oe) in the cross track direction in Example 1 and Example 2. FIG. 12 is a graph showing the magnetic field intensity in the down track direction in Examples 1 to 3 and Comparative Example 1, and FIG. 13 is a graph showing the recording magnetic field gradient in the down track direction in Examples 1 to 3 and Comparative Example 1. FIG. 14 is a graph showing a recording magnetic field gradient in the cross track direction in Example 1, Example 2, Example 4 and Example 5.

According to the results shown in FIGS. 12 and 13, it is ascertained that the magnetic field intensity Hy and the recording magnetic field gradient HGy in the down track direction would be able to be improved by including the first write gap part WG1, and the second write gap part WG2 and the third write gap part W3 that are continued to both ends in cross track direction. In addition, according to the results shown in FIGS. 10A and 10B, it is ascertained that the magnetic field intensity to be applied to the STO 10 would be increased because the second write gap part WG2 and the third write gap part WG3 have the portions where the lengths $L_{WG2}$ and $L_{WG3}$ in the down track direction are shorter than the first write gap WG1.

Further, according to the results shown in FIG. 11, it is ascertained that a magnetic field to be applied to adjacent tracks would be decreased, i.e., erasure of records in the adjacent tracks would be able to be prevented because the second write gap WG2 and the third write gap part WG3 have portions where the lengths $L_{WG2}$ and $L_{WG3}$ in the down track direction were shorter than that in the first write gap part WG1.

In addition, according to the results shown in FIG. 14, it is ascertained that the recording magnetic field gradient HGx in the cross track direction would be able to be improved if the lengths D1 and D2 from the segment CL that passes through the center of the main magnetic pole part 61 in the cross track direction, and that is in parallel in the down track direction to the portions of the lengths $L_{WG2}$ and $L_{WG3}$ in the second write gap part WG2 and the third gap part WG3 are adjusted at 120 nm or less, respectively, when viewed from the ABS 70 side.

The invention claimed is:

1. A microwave assisted magnetic head, comprising:
   a main magnetic pole that generates a recording magnetic field to be applied to a magnetic recording medium from an end surface constituting a portion of an air bearing surface opposed to the magnetic recording medium,
   a trailing shield that is disposed by interposing a write gap at a trailing side of the main magnetic pole, and that forms a magnetic path with the main magnetic pole,
   two side shields that are disposed at both sides of the main magnetic pole in a cross track direction, and
   a spin torque oscillator that is disposed within the write gap so as to be interposed between the main magnetic pole and the trailing shield, and that generates a microwave magnetic field to be superimposed on the magnetic recording field applied to the magnetic recording medium, wherein
   the write gap is configured to substantially linearly extend along a cross track direction when viewed from an air bearing surface side, and is positioned between trailing-side end surfaces of the two side shields and a trailing-side end surface of the main magnetic pole, and a leading-side end surface of the trailing shield
   the write gap comprises a first write gap part that is positioned nearly in a center in the cross track direction, and where the spin torque oscillator is disposed, and a second write gap part and a third write gap part are continued to both ends of the first write gap part in the cross track direction, and that extend toward both outer ends in the cross track direction, respectively, and lengths at least in portions of the second write gap part and the third write gap part in the down track direction are shorter than a length of the first write gap part in the down track direction.

2. The microwave assisted magnetic head according to claim 1, wherein
   lengths of the second write gap part and the third write gap part in the down track direction are shorter than a length of the first write gap in the down track direction, respectively.

3. The microwave assisted magnetic head according to claim 2, wherein
   a length of the write gap in the cross track direction is 300 nm or greater.

4. The microwave assisted magnetic head according to claim 1, wherein
   the second write gap part and the third write gap part each have a narrower gap part that is shorter than a length of the first write gap part in the down track direction; and
   when a segment that passes through a center of the main magnetic pole in the down track direction on the air bearing surface and is parallel in the down track direction is drawn, a length from the segment to the narrower gap parts in the second write gap part and the third write gap part are 120 nm or less, respectively.

5. The microwave assisted magnetic head according to claim 4, wherein
   a length of the write gap in the cross track direction is 300 nm or greater.

6. The microwave assisted magnetic head according to claim 1, wherein
   a length of the write gap in the cross track direction is 300 nm or greater.

7. A head gimbal assembly, comprising:
   the microwave assisted magnetic head according to claim 1, and
   a suspension that supports the microwave assisted magnetic head.

8. A magnetic recording device, comprising:
   a magnetic recording medium,
   the microwave assisted magnetic head according to claim 1, and
   a positioning device that supports the microwave assisted magnetic head, and, that positions the microwave assisted magnetic head relative to the magnetic recording medium.

* * * * *